UNITED STATES PATENT OFFICE.

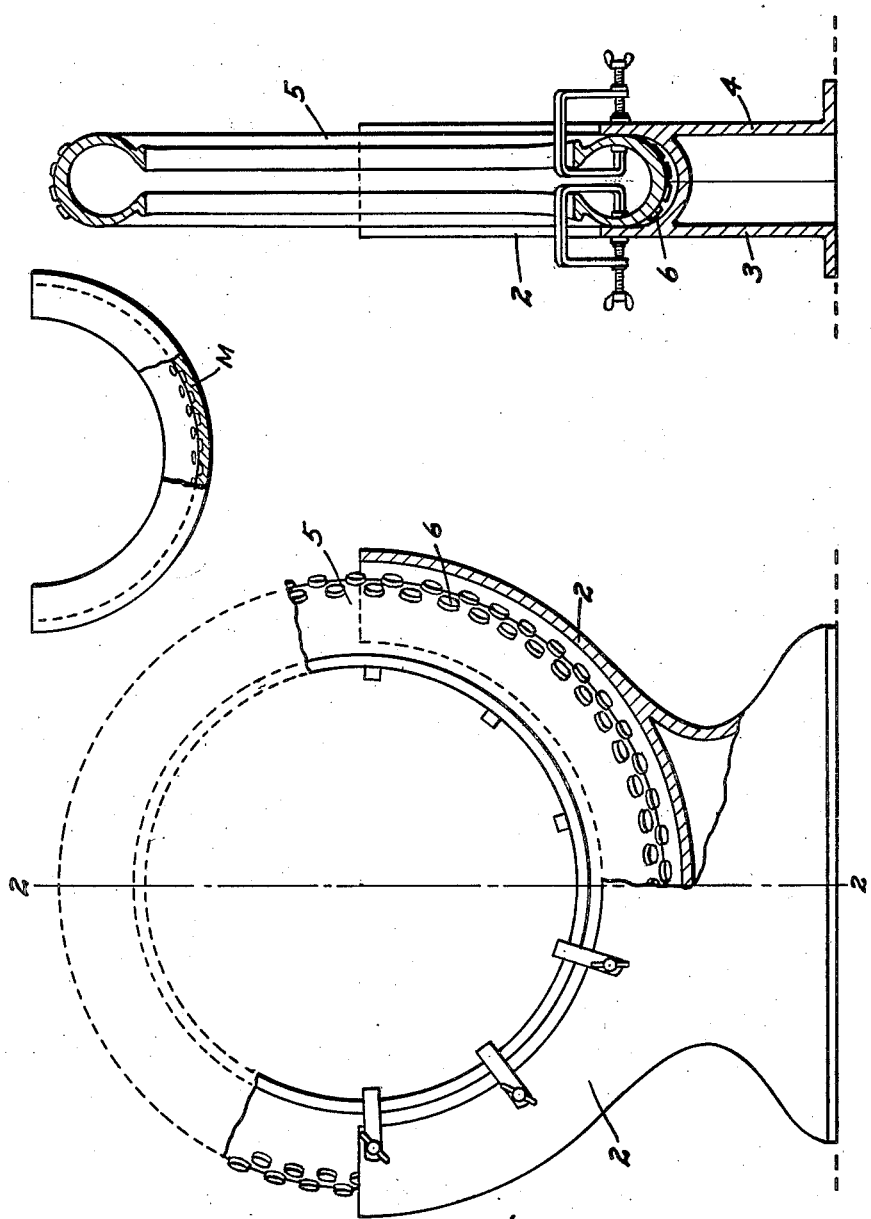

ERNEST C. HUFFORD, OF LOS ANGELES, CALIFORNIA.

METHOD OF PREPARING RETREAD-MATRIX AND PRODUCT THEREOF.

1,380,320.    Specification of Letters Patent.    Patented May 31, 1921.

Application filed December 11, 1919. Serial No. 344,249.

*To all whom it may concern:*

Be it known that I, ERNEST C. HUFFORD, a citizen of the United States, residing at Los Angeles, in the county of Los Angeles and State of California, have invented new and useful Improvements in Methods of Preparing Retread-Matrices and Products Thereof, of which the following is a specification.

This invention relates to retreading tire matrices and the method of producing the same and has for its object to provide for the economical and rapid production of a durable and inexpensive retreading matrix for retreading rubber tires and the invention consists of the construction and the method as illustrated in the accompanying drawing and described and claimed herein.

Figure 1 is a side elevation of a mold, partly broken away, constructed according to the present method.

Fig. 2 is a section on line 2—2 of Fig. 1.

Fig. 3 is a side elevation, partly in section, of the improved matrix.

The retreading of knobby or anti-skidding tires has heretofore not been successfully practised because of the difficulty and great expense in securing the desired matrix and especially because of the heavy investment in expensive matrices that would be involved in order for a retreading shop to be provided with matrices complementary to the great variety of treads.

The present invention therefore has especially in view the method of producing at low cost and in a rapid manner, matrices complementary to any given pattern of tread.

I have successfully practised the method as described herein and produced and successfully used the novel matrices.

In the practice of my method I employ a mold chamber consisting of a suitable structure and appropriate members forming a concave, semi-circular mold shell 2, in this case consisting of the right and the left hand sections 3 and 4 suitably secured together so that they may be separated on a medial line if desired to permit the removal of the cast matrix. Complementary to the mold shell 2 I employ for a pattern, preferably, any given tire carcass as 5 in the present case shown as provided with small projections 6 forming what is commonly known as a non-skidding tire tread.

Treads of the non-skidding character are not usually reproduced in retreading a tire, especially when the tread is of a knobby character because of the expense of making the matrix. In my method I erect a mold in the above described manner so as to form a space of the desired thickness between the inner surface of the mold 2 and the convex surface of the tread portion of the pattern or tire 5 and then pour into the mold cavity a liquid material, preferably, metal which when hardened about the tread of the tire will accurately reproduce a contour of the same in the negative. I have found that Babbitt metal and linotype metal are both efficiently used in the production of the matrix although it is obvious that other materials with the desired properties, may be as equally economical and efficient.

As both linotype metal and Babbitt metal have a low melting point and quickly harden, the tire retread matrix as is shown at M in Fig. 3, can be quickly and economically produced in any ordinary tire shop by the utilization of an inexpensive mold 2 and the employment of a given tire carcass as a pattern. After the matrix M has been produced it can be used repeatedly in the retreading process subsequently followed in retreading a tire. I have found that I can utilize a tire carcass as at 5 and a pattern without materially injuring the pattern and therefore it is not necessary to produce an expensive pattern but only to use a given carcass.

Various changes may be made without departing from the spirit of my invention as claimed.

I claim:

The herein described method of producing a tire retreading matrix which consists in placing a tire casing having the desired tread surface conformation in a mold and arranging said parts so that the tread surface of the casing is spaced apart from the surface of the mold then pouring molten metal in the space between the mold and tread surface of the casing and then applying the retreading matrix so formed to the tire that is to be retreaded.

In testimony whereof I have signed my name to this specification.

ERNEST C. HUFFORD.